United States Patent [19]
Wilson

[11] 3,983,034
[45] Sept. 28, 1976

[54] APPARATUS AND METHOD OF REMOVING DEBRIS FLOATING ON A BODY OF WATER

[75] Inventor: Donald E. Wilson, Dhahran, Saudi Arabia

[73] Assignee: Chevron Research Company, San Francisco, Calif.

[22] Filed: Jan. 3, 1975

[21] Appl. No.: 538,494

Related U.S. Application Data

[63] Continuation of Ser. No. 410,122, Nov. 26, 1973, abandoned.

[52] U.S. Cl. .............................. 210/73 W; 210/83; 210/242 S; 210/DIG. 25
[51] Int. Cl.² ......................................... E02B 15/04
[58] Field of Search .............. 210/242, DIG. 21, 73, 210/83, 84

[56] References Cited
UNITED STATES PATENTS

| | | | |
|---|---|---|---|
| 3,708,070 | 1/1973 | Bell | 210/242 |
| 3,730,346 | 5/1973 | Prewitt | 210/242 |
| 3,754,653 | 8/1973 | Verdin | 210/242 |

*Primary Examiner*—John Adee
*Attorney, Agent, or Firm*—R. L. Freeland, Jr.; R. T. Kloeppel

[57] ABSTRACT

A skimmer for removal of liquid and debris, such as skimming oil spills from water, comprising three pontoons, one located in each of the corners of a triangle made up of interconnecting structural members floating on a body of water. The corner pontoons are adjustably buoyant permitting the skimmer to move vertically up or down as a unit in the water so as to adapt to the wave height of the body of water. At the base of the triangle is the skimmer mouth sloping upward towards a sump. The two pontoons on each side of the sloped mouth have a clamp easily attachable to an oil boom which guides an oil slick into the skimmer. The function of the mouth is to skim off approximately two inches of the water surface. The sloped mouth terminates at an impregnable deflector centrally located between two screens that serve as a wave quieting assembly as well as a separator of debris floating on the water. The skimmed water is then directed through the debris screens into a quieting area. Once in this quieting area, the oil slick flows over a self-adjustable weir into a sump. The weir is made adjustable by a float that modifies the weir elevation with changes of liquid level in the sump. The skimmed liquid is then pumped to a storage tank from which it is recycled by letting the water at the tank bottom flow under gravity back into the oil boom.

9 Claims, 4 Drawing Figures

APPARATUS AND METHOD OF REMOVING DEBRIS FLOATING ON A BODY OF WATER

This is a continuation of application Ser. No. 410,122, filed Nov. 26, 1973, now abandoned.

BACKGROUND OF THE INVENTION

1. Field of the Invention

The present invention relates to skimmers which float on a liquid surface and whose function is to remove floating matter from that surface. More particularly, the invention is directed to an apparatus for use in removing hydrocarbonic liquids and debris floating on bodies of water.

2. Description of the Prior Art

The fact that oil underlies large bodies of water gives rise to the possibility that natural leaks from these deposits will occur. Also, the attempts to recover for commercial use these crude oil deposits through offshore drilling gives rise to accidental leaks. A further possibility for oil leaks arise when the modes now used for conveyance of crude oil from its deposit location to the refinery or other destinations are damaged while at sea.

There are three major ways now known to recover oil floating on the surface of a body of water. The first is a weir-type skimmer supported on the body of water that permits the uppermost surface of the water to flow into a sump from which the accumulated water is pumped to a separating tank located on a floating vessel or permanently located on shore. This type is basically ineffective during high seas or sea having waves above 2 feet. The second type is a floating suction skimmer. This type sucks the upper surface of the water into a separating tank. The major difficulty with a suction skimmer is the fact that it cannot operate very efficiently in water currents greater than 1 foot per second. The third type of skimmer is an absorbent surface skimmer. The most basic embodiment of this type is that of an endless absorbent belt rotating around two spaced pulleys. One pulley is located just below the oil slick; the other is near a collection pan above the water surface. The belt in the vicinity of the slick absorbs the oil and then moves toward the elevated pulley to a roller or wiper which squeezes or removes the absorbed oil into a collection pan and then continues on repeating the cycle until the oil slick is removed. The adsorbent surface skimmer, because of the many moving parts, requires serveillance and maintenance.

SUMMARY OF THE INVENTION

The present invention provides an apparatus that combines elements of the first two types mentioned above and adds new components which, when placed in the novel form described below, excel many of the commonly used skimmers.

To use the invention, an oil boom in a V shape is secured along side a floating vessel with the skimmer located at the vertex of the V. The oil boom guides the oil slick to the skimmer mouth where 1 to 2 inches of the water surface is skimmed off and directed up a sloped entrance plate located behind the skimmer mouth. The sloping entrance plate aids in separating the water surface from the underlying water.

At this point, debris floating on the slick is separated out by two debris screens, one on each side of an impregnable deflector plate also serving as a wave damping mechanism. Once through the debris screens, the skimmed water floats on a guieting area before flowing into a sump centrally located in the quieting area. The flow into the sump is regulated by a self-adjusting weir fixed to the uppermost edge of the sump. The weir is made from a flexible material that raises or lowers when the water level in the sump so does due to a float in the sump attached to the weir.

At the bottom of the sump is an outlet with a hose coupled to it through which the skimmed water flows to an inlet at the top of a settling tank aboard the floating vessel. The water in the tank is now recycled thus increasing the operational efficiency by allowing the water to flow by gravity through an outlet at the bottom of the tank back into the oil boom.

The depth of water skimmed is controlled by regulating the buoyancy in three pontoons located in each corner of the triangular shaped skimmer.

DESCRIPTION OF THE PREFERRED EMBODIMENT

Figure 2:
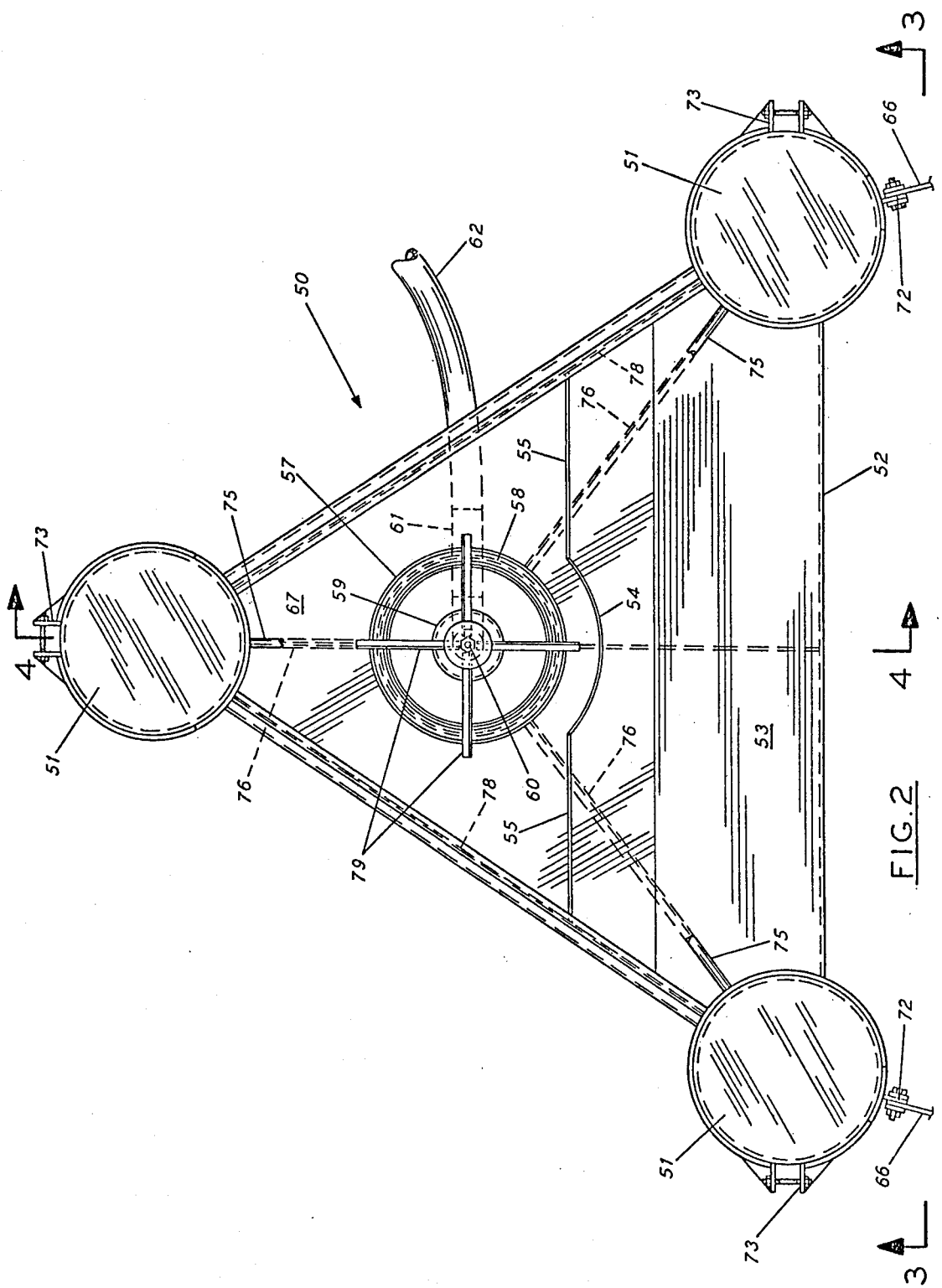
FIG. 2 is a plan view of the skimmer.

Referring now in detail to the drawings, 50 designates an oil recovery device embodying the invention. The device also called a skimmer 50 comprises three flotation pontoons 51 structurally interconnected by structural shapes 78 an clamp 73 and a skimmer mouth 52 which extends into a sloped entrance plate 53. Immediately adjacent to the entrance plate 53 is a deflector 54 located between two debris screens 55. Behind the deflector 54 and the debris screens 55 and in the center of quieting area plate 67 is a sump or container 57 centrally supported from pontoons 51 by structural members 76. The sump receives the oil and water that overflows the self-adjusting weir 58. The weir is made from rubber or other flexible materials which raises or lowers upon the buoyant force of a float 59. The float 59 is positioned within the body of the sump 57 and is guided up and down in the sump 57 by a concentrically located shaft 60 fixed to the bottom of the sump 57 and connected at its upper end to the flexible weir 58 by four equally spaced structural shapes 79 shown in FIGS. 2, 3 and 4.

Figure 3:
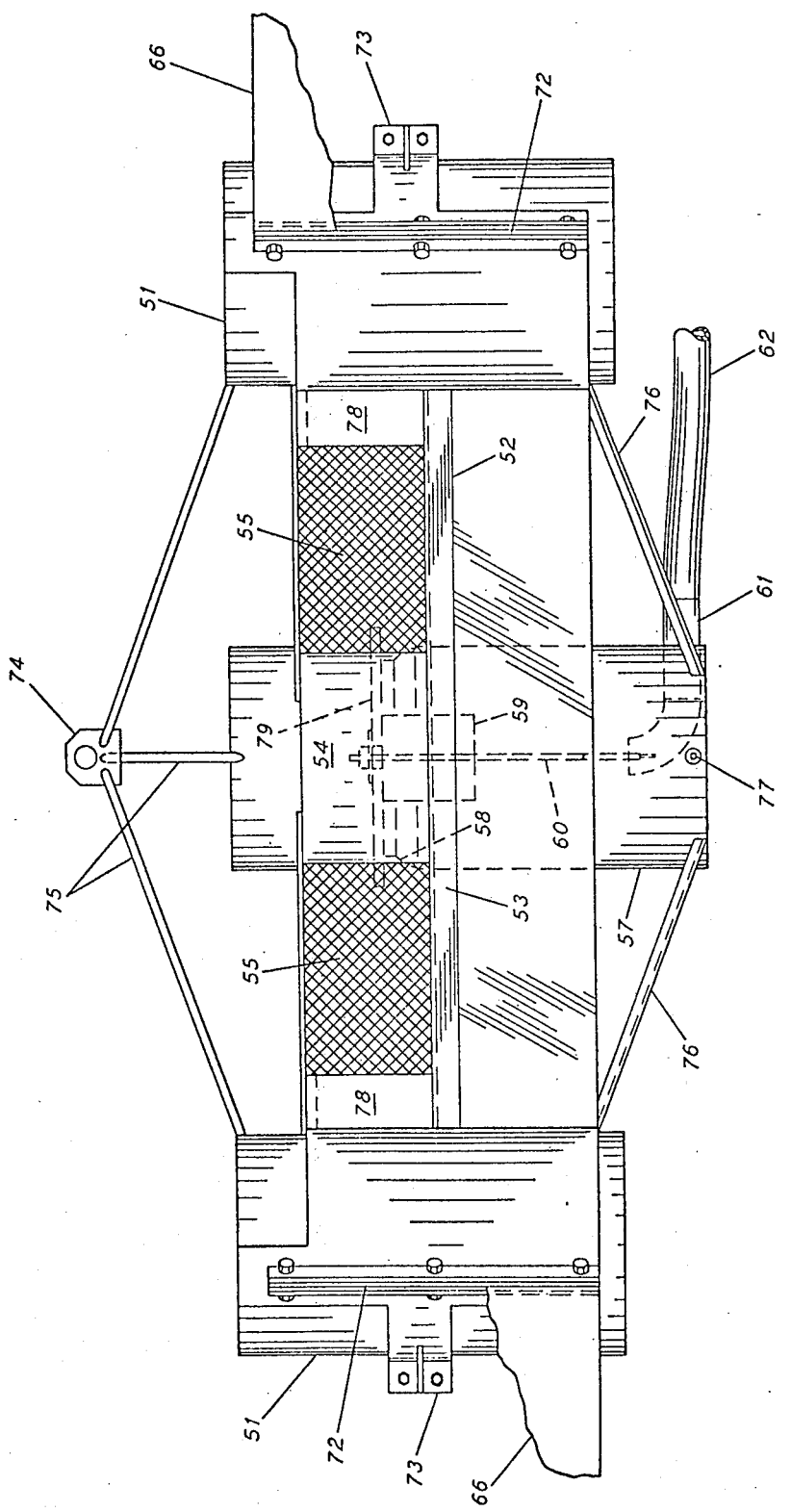
FIG. 3 is a schematic elevation of the invention taken along line 3—3 of FIG. 2.
Figure 4:
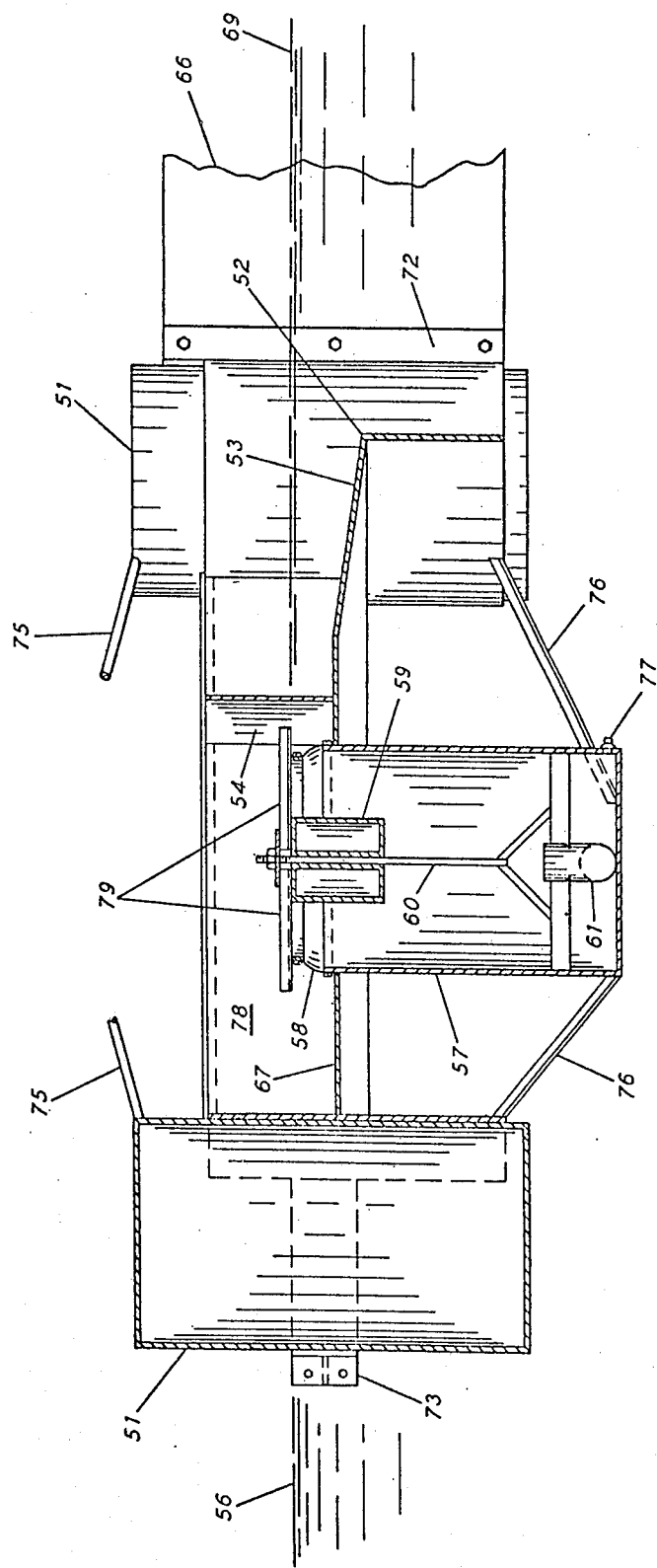
FIG. 4 is a cross sectional view taken on line 4—4 of FIG. 2.

In the vicinity of the bottom of the sump 57 is a hose outlet 61 to which a flexible hose 62 is coupled, FIGS. 3 and 4. The flexible hose 62 leads back to a floating vessel 63 and connects to a pump 64 located on the vessel 63. The pump moves the oil/water combination to a settling tank 65 on the vessel 63.

Figure 1:
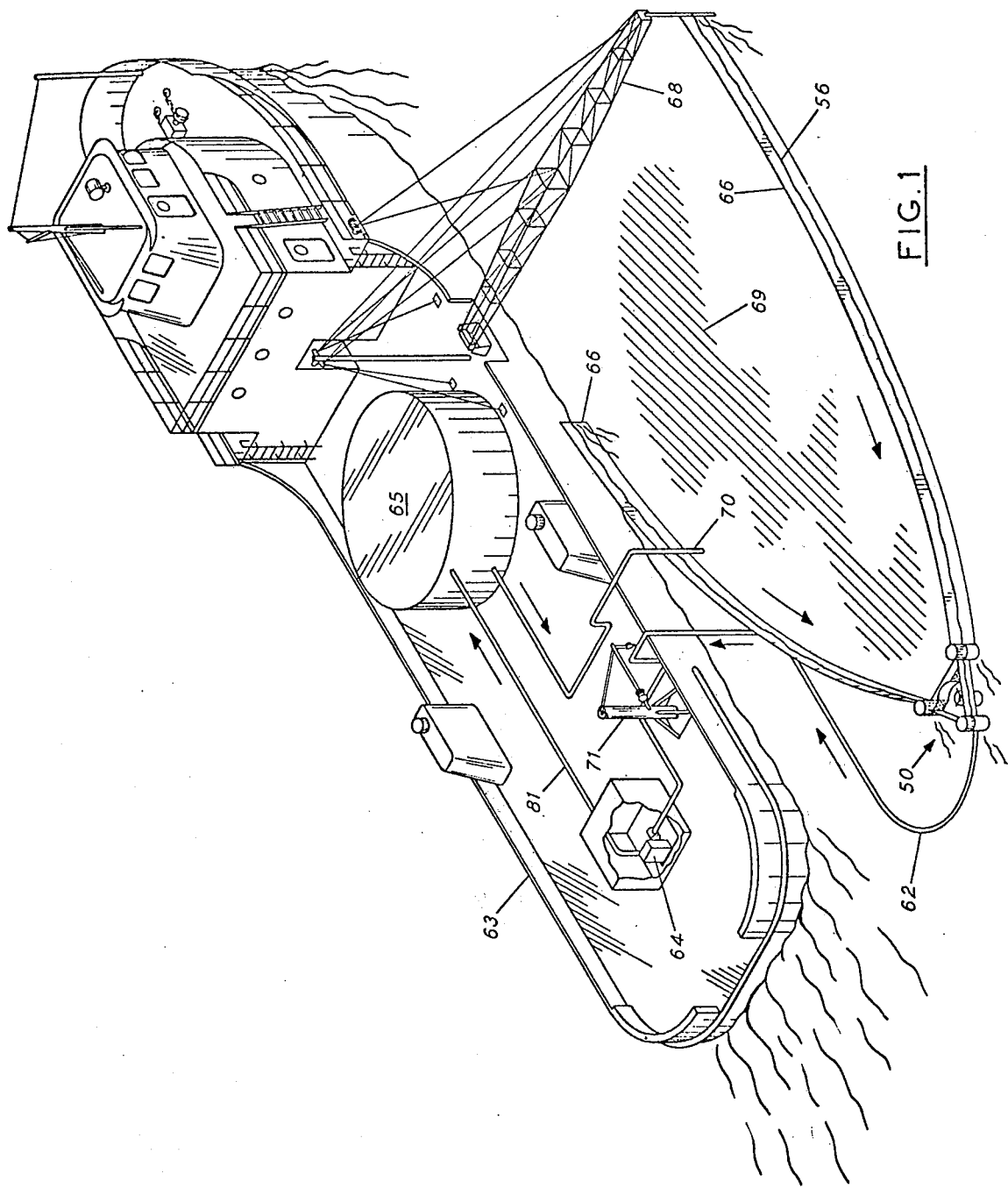
FIG. 1 is the schematic illustration of a skimmer and its arrangement when in actual operation.

In its usual application, shown in FIG. 1, the skimmer 50 is towed abreast of a floating vessel 63 equipped with storage tanks 65, a pump 64, interconnecting pipes or hoses 81 and a davit 71 for keeping the flexible hose from the aft end of the vessel 63. An outrigger 68 extending above the water surface 56 and outward from the side of the vessel 63 supports the leading edge of an oil boom 66. The trailing edge of the oil boom 66 is clamped through a bracket 72 secured to the outboard front flotation pontoon 51 of the skimmer 50 by bolting the boom 66 to the bracket 72, as in FIG. 2.

Another section of oil boom 66 is similarly secured between the inboard front flotation pontoon 51 of the skimmer 50 and the vessel 63 thus forming a V shaped trap that directs the oil and water into the mouth of the skimmer 50 shown in FIG. 1.

The oil slick 69 enters the skimmer mouth 52 then flows across an upwardly sloped entrance plate 53 along the vertical sides of the pontoon connecting members 78 through debris screens 55 to a guieting area 67 immediately behind the debris screens 55 and the deflector plate 54. The screens 55, however, do not pass debris like oil absorbing material, wood, straw, or other nonliquid floating material. The debris lodges on the entrance plate 53 providing a convenient place for removal. The upward sloping entrance plate 53 separates the upper surface of the water from the uncontaminated lower surface of the water. It also has an inherent attribute of dampening possible wave action. Attached to the sloped entrance plate 53 is a deflector 54. The deflector 54, like the entrance plate 53, serves as a positive means to reduce wave action and to direct the flow into the quieting area 67.

For maximum skimming efficiency, the flotation pontoon's 51 buoyancy is adjusted so that 1 to 2 inches of cil and water cover the quieting area 67 before the oil/water surface flows into the sump 57 located in the center of the quieting area 67. This height control serves to limit the amount of flow of the oil/water surface into the sump as well as its velocity.

Oil and water is pumped from the sump 57 through the hose outlet 61 located at the bottom of the sump 57 through a flexible hose 62, the pump 64 and a rigid pipe 81 to an oil/water separation tank 65 on board the floating vessel 63. The water which settles to the bottom in the tank is bled through a hose or hoses 70 from the tank 65 back into the area enclosed by the oil booms 66. This step aids in removing any oil traces remaining in the water bled from the settling tank 65 because it is now able to be recycled through the foregoing described procedure.

The invention is removed from the water by attaching the lifting gear (not shown) on the vessel 63 to the pad eye 74 shown in FIG. 3. The pad eye 74 is supported by three structural shapes 75 fastened to the upper end of the pontoons 51. Once the skimmer 50 is aboard the vessel 63, a drain plug 77 near the bottom of the sump 57 is removed permitting the sump 57 to be cleaned out for storage. Maintenance of this invention is minimal due to the large absence of moving parts.

Field test of the skimmer 52 indicates skimming capabilities in 4 to 5 foot waves. In such conditions, skimming efficiency is low, however, the oil readily separates from the water thus permitting bleed back to the sea. In effect, the efficiency is increased by this recycling method. In calm seas, on the other hand, skimming efficiency in the first cycle is up to 60%. Needless to say, this efficiency is greatly increased by the recycling procedure described. During the skimming operations, the forward speed of the floating vessel 63 is approximately ±¾ knot. Experiments in using the invention have indicated the assembly shown in FIG. 1 requires two hours for placing the apparatus into operation. In essence, this is a fast response skimmer designed for immediate reply to offshore spills.

The foregoing description and drawings will suggest other embodiments and variations within the scope of the claims to those skilled in the art, all of which are intended to be included in the spirit of the invention as herein set forth.

I claim:
1. Apparatus for collecting liquid and separating debris floating on a body of water comprising:
    a plurality of adjustably buoyant pontoons;
    a means for interconnecting said pontoons;
    a sloping plate for directing the flow of the liquid, debris and water a predetermined way, said plate connected between two of said pontoons;
    a plurality of vertical screens for separating said debris floating on said water from said liquid and said water, said screens secured at the upper terminus of said sloping plate;
    a quieting area plate contiguous with said sloped plate and connected to said interconnecting pontoon means;
    a container having a closed lower bottom end and an open upper top end, said container's perimeter secured to said quieting area plate;
    a flexible liquid impregnable open ended conic section operatively connected to the upper top end of said container;
    a guided float within said container, said float operatively connected to said conic section; and
    means for transporting said liquid away from said apparatus.
2. Combination of claim 1 wherein said transporting means comprises a hose outlet;
    a hose;
    a pump;
    a storage tank to which a first section of said hose is coupled to said pump and a second section of said hose is coupled to said pump and to said container.
3. Combination of claim 1 including a means operatively connected to said combination for attaching lifting equipment to lift said combination from the water.
4. Combination of claim 1 including means to drain said container when said combination is lifted out of said water.
5. The combination of claim 1 wherein said interconnecting means are structural members interconnecting said pontoons in triangular configuration.
6. Combination of claim 3 wherein said lifting attaching means is a pad eye structurally connected to said combination.
7. Combination of claim 4 wherein said draining means is a screwable drain plug.
8. The method of skimming a liquid and debris floating on a body of water comprising the steps of:
    guiding the liquid and debris to the mouth of an oil skimmer;
    skimming said liquid and debris from the water;
    flowing said liquid and debris to a screen along a sloped plate;
    removing said debris from said screen and on said sloped plate;
    passing said liquid to a quieting area;
    flowing said liquid over a weir into a container in said quieting area;
    pumping said liquid from said container to a storage tank; and
    settling said liquid so that said liquid floats to the top and said water intermixed in said liquid goes to the bottom of said tank.
9. Method of claim 8 including the step of draining said water from the bottom of said tank into said liquid floating on said water.

* * * * *